United States Patent [19]
Jessop et al.

[11] Patent Number: 5,721,652
[45] Date of Patent: Feb. 24, 1998

[54] ROLL STABILIZED, NESTING VEE, MAGNETIC HEAD ASSEMBLY FOR MAGNETICS-ON-FILM

[75] Inventors: Thomas Clifton Jessop, Webster; Douglass Lane Blanding, Rochester, both of N.Y.

[73] Assignee: Eastman Kodak Company, Rochester, N.Y.

[21] Appl. No.: 591,874

[22] Filed: Jan. 25, 1996

[51] Int. Cl.⁶ .......................... G11B 5/48; G11B 21/16; G03B 17/24
[52] U.S. Cl. .......................... 360/104; 396/319
[58] Field of Search .................. 360/104, 106, 360/107, 109, 130.3, 130.32; 352/36, 236, 243; 354/21, 106–107, 76; 358/906; 396/319–320, 336

[56] References Cited

U.S. PATENT DOCUMENTS

| | | |
|---|---|---|
| 4,933,780 | 6/1990 | Wash et al. .................. 360/1 |
| 5,016,030 | 5/1991 | Dwyer et al. .................. 354/21 |
| 5,034,836 | 7/1991 | DeMarti, Jr. et al. .................. 360/104 |
| 5,041,933 | 8/1991 | DeMarti, Jr. et al. .................. 360/104 |
| 5,229,810 | 7/1993 | Cloutier et al. .................. 355/40 |
| 5,274,522 | 12/1993 | Taillie .................. 360/130.3 |
| 5,285,324 | 2/1994 | Weigand et al. .................. 360/3 |
| 5,285,325 | 2/1994 | Kiesow .................. 360/3 |
| 5,307,100 | 4/1994 | Kubo .................. 354/105 |

FOREIGN PATENT DOCUMENTS

| | | |
|---|---|---|
| 0 556 594 | 8/1993 | European Pat. Off. . |
| 0 589 270 | 3/1994 | European Pat. Off. . |

*Primary Examiner*—Stuart S. Levy
*Assistant Examiner*—George J. Letscher
*Attorney, Agent, or Firm*—Frank Pincelli

[57] ABSTRACT

A magnetic read/write head suspension assembly and support roller particularly for use for recording and reading information on a magnetics-on-film (MOF) layer outside the image area of photographic filmstrips. The filmstrip is pressed against the support roller by upstream and downstream wrap rollers so that an angle of wrap over a predetermined length of the filmstrip in the filmstrip transport direction is achieved around the circumferential surface of the support roller that tends to flatten out cross film curl. Magnetic read/write heads are supported to bear against the edge regions of the filmstrip MOF layer opposite to the support roller and within the angle of wrap. The magnetic read/write heads are supported in a nesting VEE arrangement so that the head gaps can make a line contact of a predetermined head gap length extending in the direction of the filmstrip width. Edge guides track the filmstrip edges to position the magnetic read/write heads to follow the prerecorded magnetic tracks at preset distances from the respective filmstrip edges.

22 Claims, 6 Drawing Sheets

ROLL STABILIZED, NESTING VEE, MAGNETIC HEAD ASSEMBLY FOR MAGNETICS-ON-FILM

CROSS-REFERENCE TO RELATED APPLICATIONS

Reference is made to the following commonly assigned, co-pending U.S. Pat. No. 5,473,402, issued Dec. 5, 1995 for FILM PROCESSING SYSTEM in the names of Francis C. Long, Walter C. Slater, Thomas J. Murray, Bradley C. DeCook, and Howard C. Bozenhard

FIELD OF THE INVENTION

This invention relates to a magnetic record and/or reproduce head suspension assembly for achieving high magnetic head compliance with the magnetics-on-film (MOF) layer of relatively stiff photographic filmstrips particularly during photofinishing operations.

BACKGROUND OF THE INVENTION

In commonly assigned U.S. Pat. Nos. 4,933,780 and 5,016,030, a photographic filmstrip having a virtually transparent, magnetic film layer on the non-emulsion side of the filmstrip (referred to as an MOF layer) is disclosed in conjunction with various camera systems. One or more longitudinal read/write tracks are illustrated in the MOF layer between the side edges of the image frame area and the filmstrip where information such as film type, film speed, film exposure information and information relevant to the processing and subsequent use (e.g., printing) of the exposed image frames is pre-recorded during manufacture of the filmstrip cartridge. The cameras disclosed therein provide for reading out the pre-recorded information useful for controlling camera operations and recording of information on certain other tracks during camera use. The information recorded during camera use may include voiced messages or sound associated with the photographed scene and may be recorded in digital or analog format on the certain tracks. It is contemplated that both the pre-recorded and the camera use recorded information will be read out for control and reprint purposes during photofinishing. Also, it is desirable for the photofinisher to have the capability to record additional information related to finishing, e.g. printing exposure conditions, customer information, reorder information, etc. in further tracks.

A photographic filmstrip is described in detail in commonly assigned U.S. Pat. No. 5,229,810, for example, incorporated herein by reference, having an optically transparent MOF layer continuously coated on the non-emulsion side of the filmstrip base. Turning first to FIGS. 1A and 1B, they schematically depict such a filmstrip 100 of the type described in the U.S. Pat. No. '810 patent having a base 110 with photographic emulsion layers 115 on one side and a virtually transparent MOF layer 120 on the non-emulsion side. An anti-static and lubricating layer 122 covers the MOF layer 120, and perforations 125 are provided for metering image frame areas through a camera exposure gate. Each image frame area of the filmstrip 100 includes a set of edge strip regions of the MOF layer 120, e.g. regions 100a and 100b, including record/reproduce track pairs C0, C1 and C2, C3 adjacent to respective filmstrip edges 102 and 104. A central image frame region of the MOF layer 120 includes tracks F00–F29 extending the image frame length 100a. The filmstrip 100 has a predetermined nominal width 108 for the filmstrip type, and tracks C0–C3 and F00–F29 have defined widths.

As described in the U.S. Pat. No. '810 patent in detail, the edge tracks C0–C3 are intended to be used for recording exposure related information in a camera having edge mounted magnetic recording heads. Certain of the tracks F00–F29 are intended to contain filmstrip type information pre-recorded by the filmstrip manufacturer, and other of the tracks F00–F29 are reserved for recording information during photofinishing.

In a variation of the filmstrip 100, recording and reproducing in the tracks F00–F29 is not practiced, and the MOF layer 120 may or may not be coated over the image frame area. In this variation, one or more of the tracks C0–C3 in the edge regions 100a and 100b are used for recording print related information, e.g. the color correction and exposure data applied in the most recent set of prints made from the image frames. In such photofinishing equipment as described in the above-referenced U.S. Ser. No. 08/171,582 application, certain of the tracks are read out prior to printing to control printing operations, and the print related information is recorded in the recording tracks contemporaneously with making the print exposure.

The photographic filmstrip 100 is of much greater thickness than the magnetic tape used for commercial and consumer recording and reproduction and is neither compliant nor inherently flat. When removed from its cartridge, such a filmstrip shows a relatively high stiffness and very observable cross-curvature across its width that is convex on or toward the emulsion side of the filmstrip. Further, the unwrapped filmstrip also shows a convex curvature along its length, again on the non-emulsion side of the film. This latter curvature is attributed primarily to a core-set curl that results from the filmstrip having been tightly wound on a film cartridge spool.

The cross-film curvature or curl across the width of the filmstrip is primarily caused by the number of multilayers of emulsion and MOF layer. The emulsion and MOF multilayers have different stretch properties than that of the base film substrate of acetate, PET, or PEN material. The cross-film curl is also influenced by the bending phenomena known as anticlastic curvature. The degree of cross-film curl also depends on environmental conditions, including the time and temperature history of the film, the relative humidity, and the thickness of the film.

Because of the cross-film curl, it is difficult to achieve good contact or compliance across the width of a wide, multi-head array. To provide a reliable read or write signal, the length of the magnetic recording head gap must remain in close proximity to the magnetic coating. Any disturbances, such as variations in cross film curl, can vary the relationship of the recording head gap to the magnetic coating and decrease the reliability of the signal.

Referring back to FIG. 1A, this can occur as well in the camera, and the actual location of the tracks C0–C3 with respect to filmstrip side edges 102, 104 may vary as described in the U.S. Pat. No. '810 patent. Also, the tracks C0–C3 may vary in shape and width as described in the U.S. Pat. No. '810 patent. In addition, the location of the side edge tracks C2 and C3 are between the image frame related sprocket holes or perforations 125 which cause localized distortion of the filmstrip curl in the edge region 100b. Moreover, in the photofinishing context, a series of filmstrips may be spliced together, and the spliced ends may be laterally offset. Finally, filmstrip widths 108 may vary with age and type, and filmstrip edges may be irregular.

Therefore, it is necessary to the extent possible to flatten out the transverse or cross film curl particularly at the side edge regions 100a, 100b where the MOF recording tracks C0–C3 are situated, to provide the flat plane during read out of tracks C0–C3 and to track the filmstrip edges 102, 104 as closely as possible.

Commonly assigned U.S. Pat. Nos. 5,034,836, 5,041,933, 5,274,522, 5,285,324 and 5,285,325 and further U.S. Pat. No. 5,307,100 disclose magnetic recording head configurations for use in recording and/or reproducing in longitudinal tracks alongside the filmstrip edges but not in the image frame area. These patents showing magnetic recording heads for recording along the edges of the filmstrip outside the image area generally teach shaping the magnetic record/reproduce heads as arc sections of a cylinder and either flattening the filmstrip or wrapping or conforming the filmstrip MOF layer over the arc section to provide a line contact of the magnetic head gap with the MOF layer. Pressure pad supports or rollers on the emulsion side opposite from the recording heads and continuous motion of the filmstrip are taught to provide compliance for recording and/or reproducing information.

These arrangements cause the filmstrip to be wrapped or straightened against its inherent cross-film and longitudinal curl. This can cause the edge strip regions 100a and 100b to be inclined to curl away from the magnetic head gaps in the head gap length direction extending toward the side edges 102, 104.

In the photographic filmstrip bearing the MOF layer described above, the density of the virtually transparent MOF layer is much lower than in magnetic tape. Because of the low magnetic density of the MOF layer and the susceptibility of the emulsion side to scratching and damage, it is of particular importance that the magnetic read/write head-to-film interface must have high compliance and avoid scratching the MOF layer or the emulsion layers. As a result, extreme care must be taken in the design of the components of the interface to ensure that a minimum of surface damage occurs at the magnetic head interface and any load supporting member on the emulsion side of the film. Continued improvement in this area remains highly desirable.

Problems to be Solved by the Invention

The invention is directed to solving the above stated problems of recording and reproducing information on MOF layers of a filmstrip, particularly in filmstrip processing, handling or other apparatus, while avoiding damage to the filmstrip. In addition, the invention is directed to achieving enhanced compliance of an edge track or tracks of a filmstrip MOF layer particularly with magnetic read head(s) while allowing the filmstrip image area to be unsupported and thereby not subjected to potential scratching.

SUMMARY OF THE INVENTION

It is, therefore, a primary object of the invention to enhance the compliance of a magnetic read/write head with the MOF layer of a filmstrip for recording and/or reproducing information accurately in one or more parallel tracks in the MOF layer of a photographic filmstrip.

It is a further object of the invention to provide a simplified edge tracking and head alignment system for magnetic read/write heads for MOF layer recording and reproducing as well as in other magnetic webs.

These and other objects of the invention are realized in a magnetic read/write head support system for recording and/or reproducing information in an elongated, flexible magnetic web advanced in a web transport direction through a web transport path, said system comprising: a web support roller in said web transport path having an axis of rotation; wrap means located in said web transport path for wrapping said web about a wrap section of said support roller; a magnetic head suspension assembly further comprising: first and second head suspension sub-assemblies spaced apart in the width dimension of said web; a first pair of magnetic read/write heads supported by said first head suspension sub-assembly having respective head surfaces adapted to bear against said web, said head surfaces aligned at a fixed angle to one another in a VEE relationship; a second pair of magnetic read/write heads supported by said second head suspension sub-assembly having respective head surfaces adapted to bear against said web, said head surfaces aligned at said fixed angle to one another in said VEE relationship; and means for fixedly attaching said first and second head suspension sub-assemblies together so that said first and second pairs of magnetic read/write heads form a nesting VEE relationship with respect to said web support roller and the magnetic web wrapped over said web support roller.

Advantages of the Invention

The wrapping of the filmstrip about the support roller between the wrap rollers in the serpentine manner with the emulsion layer facing the support roller flattens out cross film curl and allows the magnetic record/reproduce head(s) to effectively apply pressure against the MOF layer to ensure flatness, particularly along the edge strip regions of the filmstrip that are susceptible to curl. The "nesting VEE" arrangement of the heads in the magnetic head suspension assembly with respect to the support roller enables compliance of all of the magnetic read/write head gap(s) with the edge strip regions of the filmstrip MOF layer and the flattening of any residual edge curl. The single degree of freedom in the width dimension allows the magnetic head(s) to accurately follow the side edges of the filmstrip and to be centered on the tracks in the strip regions of the MOF layer for reading or writing in the tracks. The movement of the head suspension assembly between the advanced position pressing the filmstrip against the support roller and the retracted position apart from the support roller and with the edge guides spread apart allows the filmstrip to be advanced and threaded over the support roller in the serpentine fashion without interfering with the edge guides edge guides and allows the self centering action to accurately position the magnetic head(s).

BRIEF DESCRIPTION OF THE DRAWINGS

These and other objects, advantages and features of the invention will become apparent from the detailed description given hereinafter in relation to the accompanying drawings, in which.

DETAILED DESCRIPTION OF THE PREFERRED EMBODIMENTS

Figure 1A:
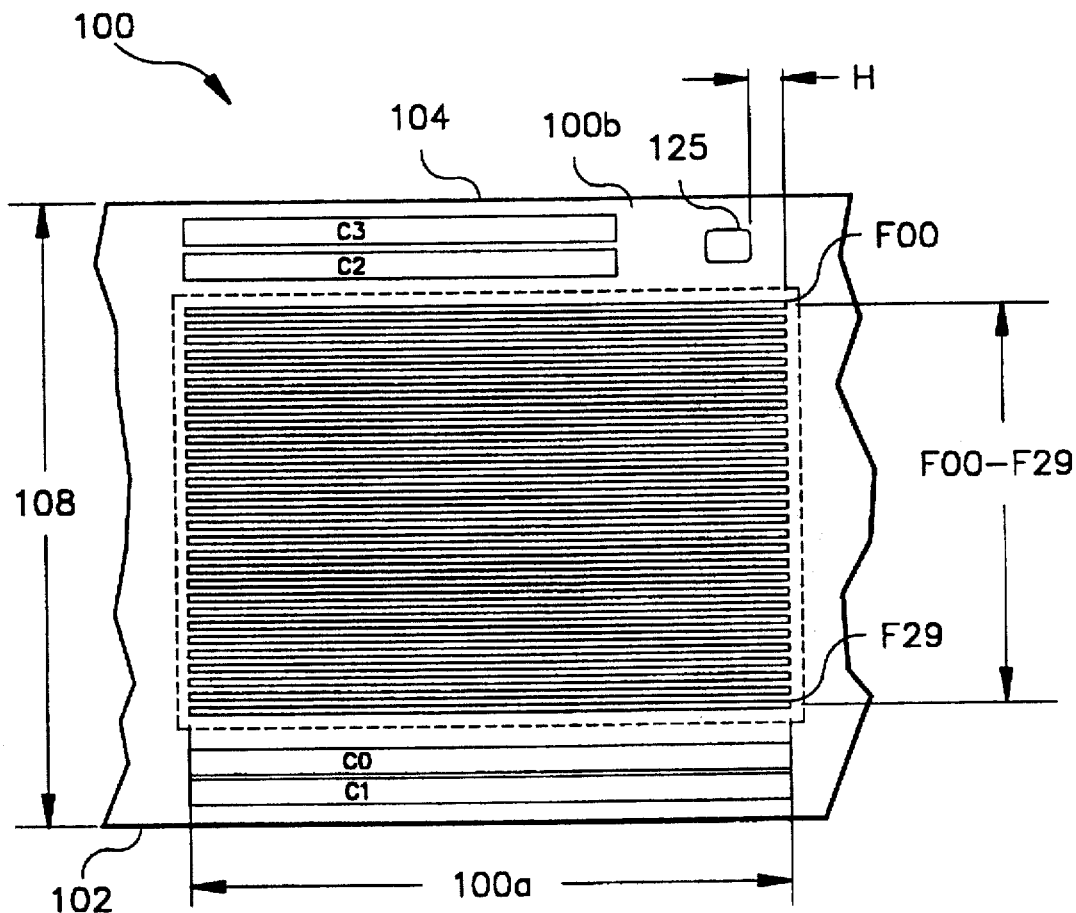
FIG. 1A is a plan view of a prior art photographic filmstrip with a MOF layer and dedicated recording tracks which can be employed in the practice of the invention.
Figure 1B:
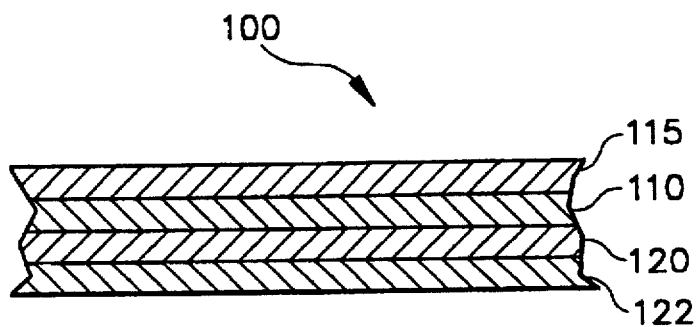
FIG. 1B is a side cross-sectional view of the prior art filmstrip of FIG. 1A.

Preferably, the present invention is practiced with a filmstrip having an MOF layer coated as described above with respect to FIG. 1, and particularly for recording and reproducing only in all (or less than all, when dummy magnetic heads are used) of the edge tracks C0–C3. The magnetic head suspension assembly and support roller of the present invention may be employed in the processing system of the above-referenced U.S. Ser. No. 08/171,582 application, or other photofinishing equipment to read out data recorded in MOF layer edge strip region tracks of such filmstrips to employ in controlling image reproduction operations or in other contexts. In addition, such equipment may be used to record information in certain of the tracks As described above, the typical prior art practice in this field has been to shape the magnetic record/reproduce heads as arc sections of a cylinder and to wrap or conform the filmstrip MOF layer over the arc section or to straighten the filmstrip as much as possible. This bending of the filmstrip 100 is against its normal, unstressed tendency to curl and is not always effective.

Figure 2A:
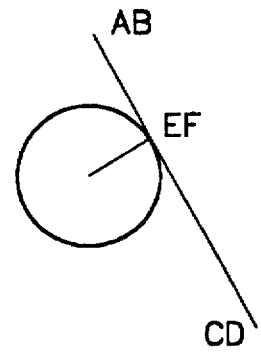
FIGS. 2A–2D are schematic views illustrating the principles of the invention.
Figure 2B:
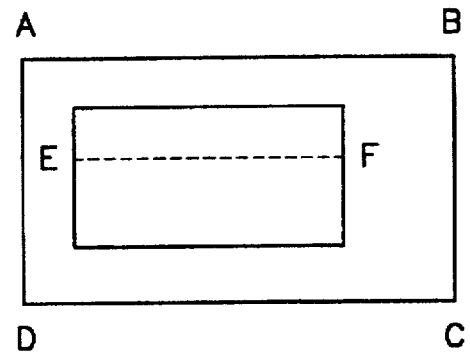
Figure 2C:
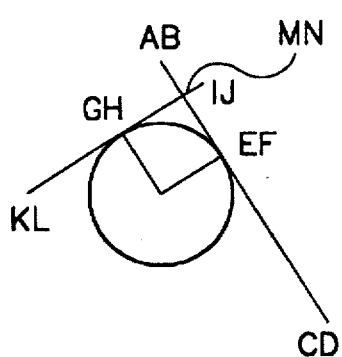
Figure 2D:
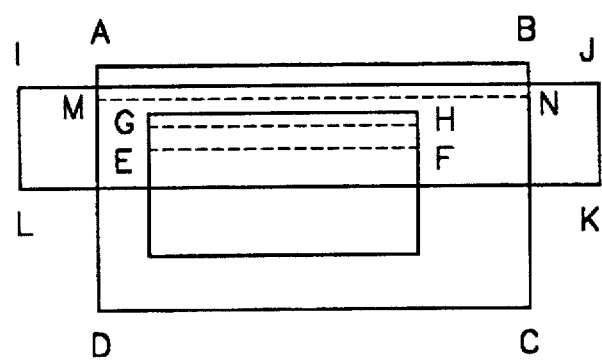

Turning to FIGS. 2A–2D, the nesting VEE principle of the alignment of the four magnetic heads (or combination of magnetic heads and dummy heads of the same configuration) employed in the present invention is schematically illustrated. In FIGS. 2A and 2B, an imaginary plane ABCD is brought into line contact EF with a cylinder surface S. In FIGS. 2C and 2D, a second imaginary plane IJKL is brought into line contact GM with the cylinder surface S. If the line contacts EF and GH not in the same diameter line directly across the center of the cylinder, then the two imaginary planes ABCD and EFGH will intersect. The line of intersection MN will be parallel with the axis of the cylinder. Tangent lines to the cylinder circumference drawn from any points along the line contacts EF, GH will intersect in the line of intersection MN.

The imaginary planes can be realized in a physical V-shaped structure having a pair of planar surfaces conforming to the planes ABCD and EFGH, the planar surfaces intersecting in the line of intersection MN. If the contact lines EF and GH are marked on the planar surfaces, and the a physical cylindrical structure corresponding dimensionally to cylinder surface S is placed in a nesting relationship to the V-shaped structure, then the contact of the cylindrical structure surface S will always follow line contacts EF and GH. This ability to always repeat the location of the cylinder on the planes is known as nesting, and particularly as a nesting VEE ability.

This principle is used in the context of the present invention in that magnetic record/reproduce heads are mounted in a head suspension assembly so that each head surface conforms to the planes ABCD and IJKL. At the same time, each head gap is aligned, in the length direction of the gap, to follow the like contacts EF and GH when the head suspension assembly is moved from a retracted position into an advanced position relative to a support roller. A filmstrip is interposed between the head suspension assembly and the support roller surface such that the contact lines are effectively projected through the filmstrip. Each time that the head suspension assembly and the support roller are brought together, the magnetic head gaps are brought against the filmstrip MOF layer in the same alignment with respect to the contact lines EF and GH.

Figure 3:
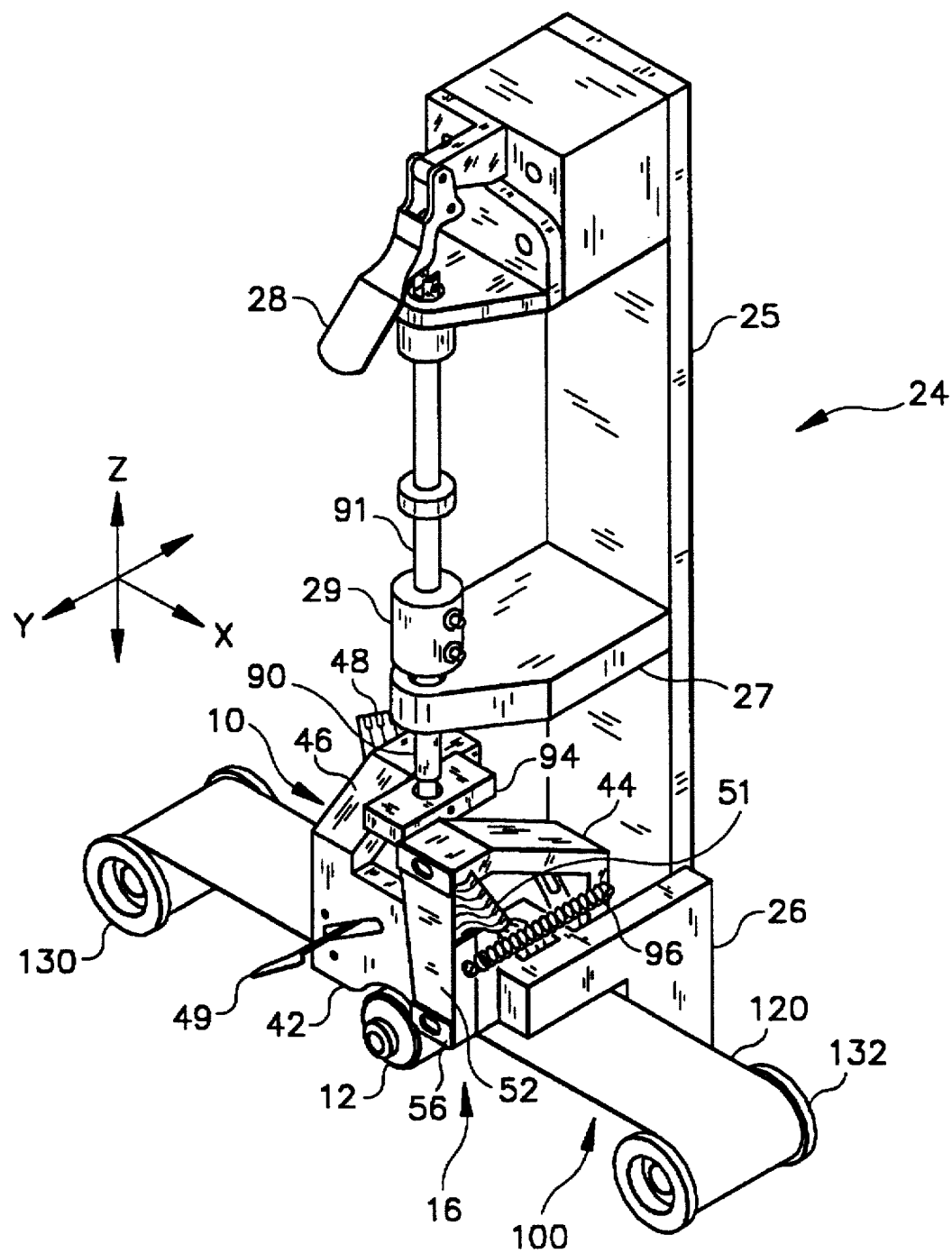
FIG. 3 is a perspective elevation view of the magnetic head suspension assembly of the invention with respect to a filmstrip transport path, support and wrap rollers and a lift mechanism.
Figure 8:
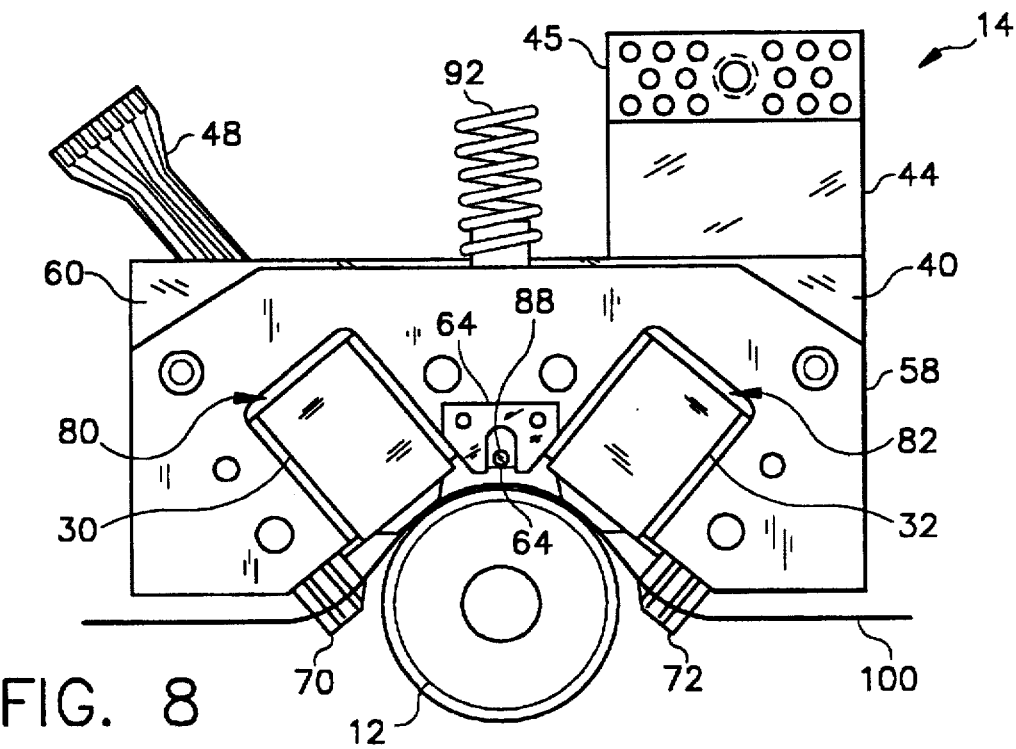
FIG. 8 is a further side schematic view of a first subassembly of the magnetic head suspension assembly of FIG. 3.
Figure 9:
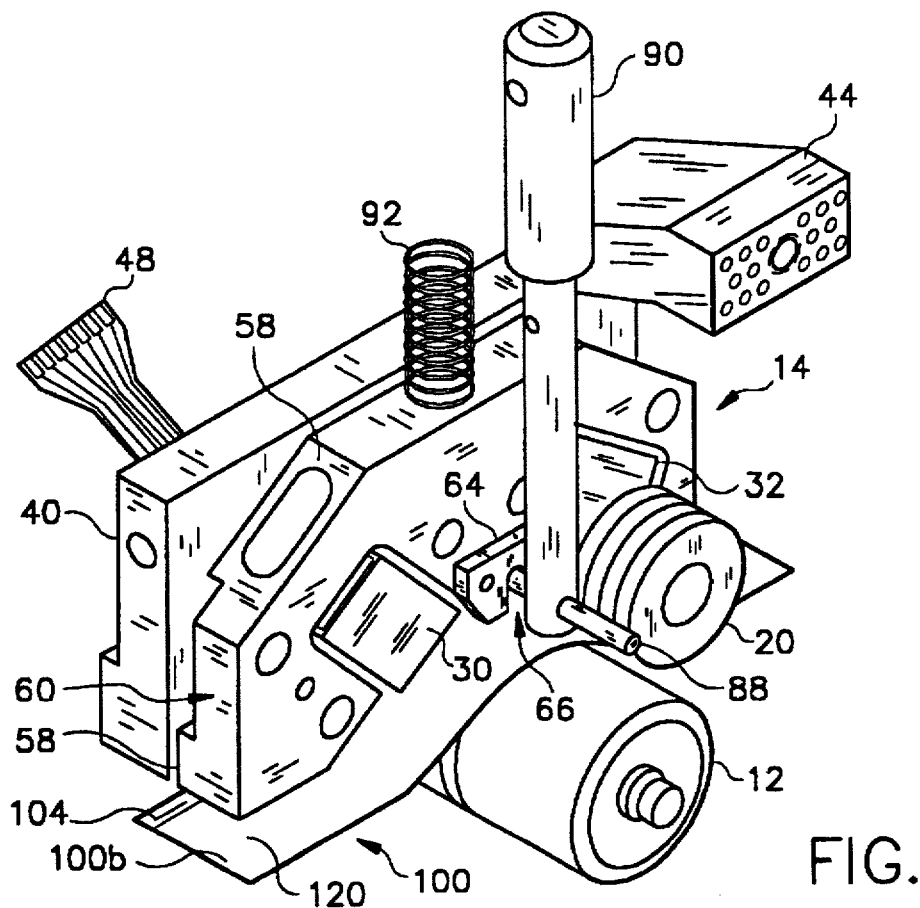
FIG. 9 is a perspective view of the first subassembly of the magnetic head suspension assembly of FIG. 8 with an added view of a support shaft and filmstrip wrap roller.

In this regard, in accordance with these principles of the invention, a filmstrip transport path between a magnetic head suspension assembly 10 and a support roller 12 particularly for read out of the tracks C0–C3 by a photofinisher is defined. The emulsion layer of filmstrip 100 is wrapped around a support roller 12 extending across the width 108 of the filmstrip 100. The filmstrip 100 is pressed against the support roller 12 by upstream wrap roller 20 and downstream wrap roller 22 in a serpentine fashion as depicted in FIGS. 3, 8 and 9. An angle of wrap over a predetermined length of the filmstrip 100 in the filmstrip transport direction is achieved around the circumferential surface of the support roller 12 that tends to flatten out the cross film curl and suppress edge curl at the edges 102, 104. The wrapping of the filmstrip 100 is about its inherent longitudinal curvature, and the cross-film curl causes filmstrip edges 102, 104 to press against the surface of support roller 12. The lateral stiffness across the filmstrip 100 is also increased by the flattening of the filmstrip as it is wrapped in the serpentine path.

As shown in FIGS. 3–10, first and second pairs of magnetic read/write heads 30, 32 and 34, 36 are supported to bear against the edge strip regions 100a, 100b, respectively, of the filmstrip 100 opposite to the support roller 12 and within the angle of wrap of the filmstrip 100. The magnetic read/write heads 30, 32, 34, 36 are supported in a VEE-block manner described hereafter so that the head gaps can make a tangential line contact of a predetermined head gap length extending in the direction of the filmstrip width. Edge guides 70, 72, 74, 76 track the filmstrip edges to position the pairs of magnetic read/write heads 30, 32, and 34, 36 to follow the pairs of magnetic tracks C3, C2 and C0, C1 at preset distances from the respective filmstrip edges 104, 102.

In accordance with the preferred embodiment of the present invention, the magnetic head suspension assembly 10 includes first and second head suspension sub-assemblies 14 and 16 which support the pairs of magnetic read/write heads 30, 32 and 34, 36, respectively, for relative movement with respect to one another in the filmstrip width or Y-direction in order to track the actual filmstrip width. The assembly 10 otherwise is rigid and allows virtually no other relative movement of the pairs of magnetic read/write heads 30, 32 and 34, 36 with respect to one another in any of the other directions. The pairs of magnetic read/write heads 30, 32 and 34, 36 are spaced from one another both laterally across the width of the filmstrip 100 and around the angle of wrap about the support roller 12. In this fashion, the magnetic read/write heads 30, 32, 34, 36 are spaced to follow the tracks C0, C1, C2, C3, respectively, when the filmstrip edges 102, 104 track filmstrip edge guides 70, 72, 74, 76. Moreover, the line contacts of the head gaps of the magnetic read/write heads 30, 34 and 32, 36 are aligned to fall in the planes ABCD and IJKL after the assembly 10 self aligns with the axis of the support roller 12 when it is in the advanced position.

In order to achieve this nesting VEE alignment of all four magnetic read/write heads with the filmstrip 100 and support roller 12, the magnetic head suspension assembly 10 is allowed to self align against and track the edges of the filmstrip 100 when it is in the advanced position. Pressure is applied through the rigid assembly 10 to self center the assembly 10 to the support roller 12 and flatten out any residual filmstrip curl in the strip regions 100a and 100b adjacent to the filmstrip edges.

Turning again to FIG. 3, it depicts a perspective assembly view of the magnetic head suspension assembly 10 of the present invention in relation to the support roller 12, the wrap rollers 20, 22, filmstrip 100 and a lift mechanism 24 for raising and lowering the assembly 10 between the advanced and retracted positions. FIGS. 4–7 also depict the magnetic head suspension assembly 10 in a variety of views, and FIGS. 8 and 9 depict the details of the subassembly 14. The first and second sub-assemblies 14 and 16 include first and second head support frames 40 and 42 extending longitudinally in the direction of filmstrip transport alongside the filmstrip edge regions 100a, 100b and supporting the first and second pairs of magnetic read/write heads 30, 32 and 34, 36, respectively, in the spacings described above. The frames 40 and 42 bridge the support roller 12 and sandwich the wrap rollers 20 and 22 between them. The wrap rollers 20, 22 (supported by separate support axle members from magnetic head suspension assembly 10) bear against the image area tracks F00–F29 of the filmstrip 100 and press filmstrip 100 as flat as possible (in the filmstrip width or transverse direction) against the support roller 12.

The support roller 12 is mounted at its axle 18 for rotation in bearings (not shown) of a filmstrip transport frame (not shown) so that it rotates freely about a roller axis. The wrap rollers 20, 22 are also supported on roller bearings and axle assemblies (not shown) and mounted to the frame (not shown) by mounting arms, e.g. mounting arm 26 for wrap roller 20 shown in FIG. 3. The axes of rotation of the support roller 12 and the wrap rollers 20, 22 are therefore fixed in parallel with respect to one another during filmstrip transport. The serpentine filmstrip transport path extends between the wrap rollers 20, 22 and the support roller 12. A filmstrip advance mechanism (not shown) is spaced apart from the position of the support roller 12, wrap rollers 20, 22 and the magnetic head suspension assembly 10 along the filmstrip transport path. Operation of the filmstrip advance mechanism imparts motion to the filmstrip 100 to advance it from supply reel 130 to take-up reel 132 (shown in FIG. 3) which in turn causes the support roller 12 and the wrap rollers 20, 22 to roll freely.

Figure 4:
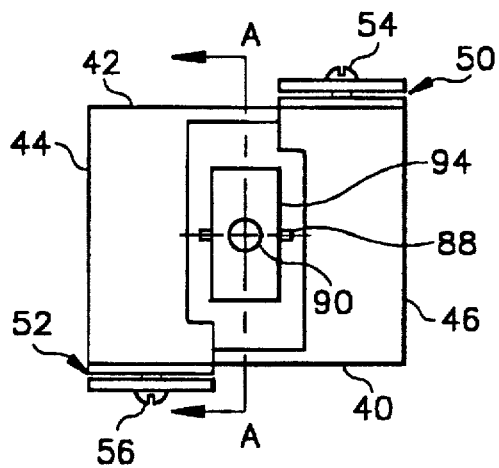
FIG. 4 is a top schematic view of the magnetic head suspension assembly of FIG. 3.
Figure 5:
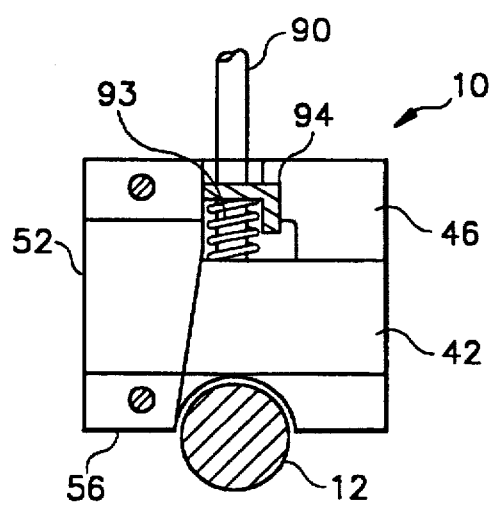
FIG. 5 is a front elevation schematic view of the magnetic head suspension assembly of FIG. 3.
Figure 6:
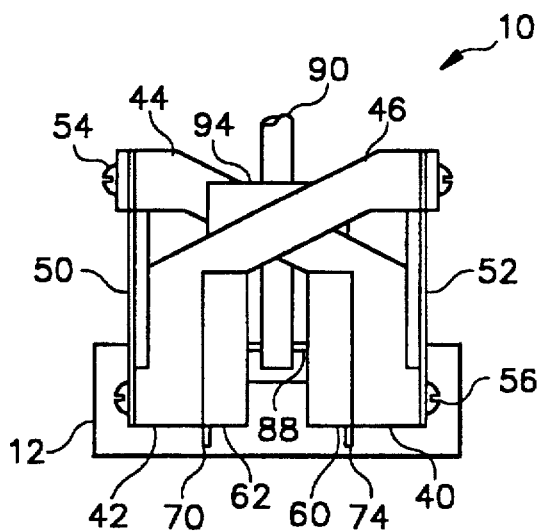
FIG. 6 is a side elevation schematic view of the magnetic head suspension assembly of FIG. 3.

As shown best in FIGS. 4–6, first and second bridges 44 and 46 each extend from a first, oppositely disposed end of the frames 40 and 42, respectively, to a plane terminating above and generally co-planar with an outer side plane of the second end of the frames 42 and 40, respectively, as shown in the figures. First and second planar flexures 50 and 52 are attached between and extend from the terminating planar ends of the bridges 44 and 46 and to the outer planar sides of frames 40 and 42. The planar flexures 50, 52 are made of thin metal or other sheet material and are attached to the planar ends of bridges 44, 46 and outer planar sides of the ends of the frames 40, 42 opposite to the bridges 44, 46, respectively.

First and second head and edge guide assemblies 60, 62 (FIGS. 8–10) are attached to the inside planar surfaces of frames 40, 42 and support the first and second pairs of magnetic read/write heads 30, 32 and 34, 36 and first and second pairs of edge guides 70, 72 and 74, 76. An interior side view of the first head suspension subassembly 14 parallel with the axle of the support roller 12 and with the wrap rollers 20, 22 omitted is shown in FIG. 8. The magnetic read/write heads 30, 32 are mounted into head slots 80, 82 of an alignment block 58 of the first head and edge guide assembly 60. The first pair of filmstrip edge guides 70 and 72 extend downward from the alignment block 58 to contact the side edge 102 of the filmstrip 100 drawn between the wrap rollers 20, 22 (not shown) and the support roller 12. The assembly 60 also includes a pin slot block 64 attached to the alignment block 58 having pin slot 66 formed therein.

The head slots 80, 82 in alignment block 58 precisely align the magnetic read/write heads 30 and 32 so that the respective head gaps are parallel to one another. Tangent lines drawn perpendicular to the head gap lengths of magnetic heads 30, 32 form the VEE alignment with the pin slot 66. In like fashion, tangent lines drawn perpendicular to the head gap lengths of magnetic heads 34, 36 form the VEE alignment with the pin slot 86. When the head subassemblies 14 and 16 are assembled into the head suspension assembly 10 as described below, the tangent lines of contact of the head faces and gaps with respect to the support roller 12 fall into the planes ABCD and IJKL of FIGS. 2A–2D.

Figure 10:
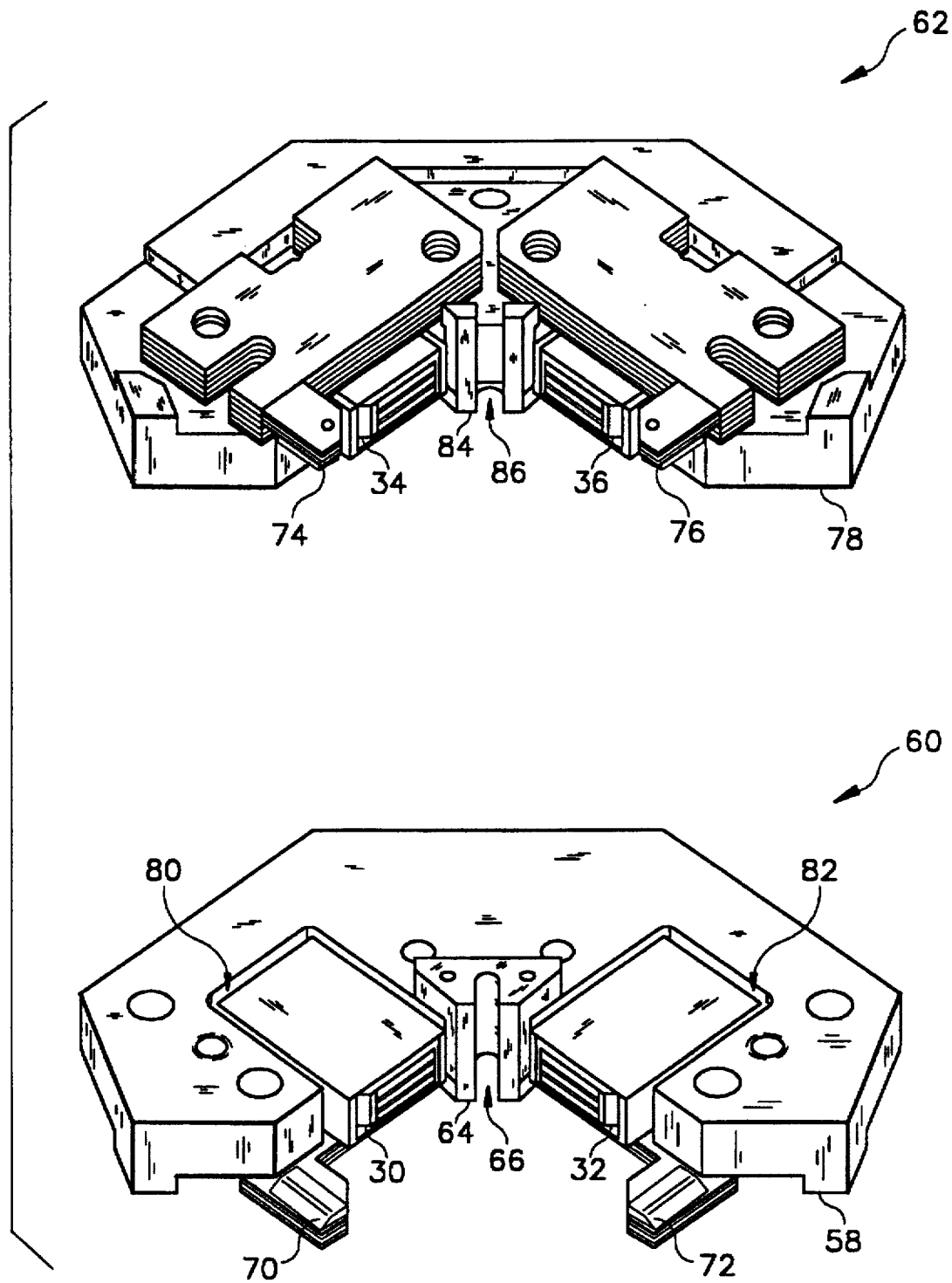
FIG. 10 is a further perspective view of the first and second magnetic head subassemblies positioned in space for viewing the nesting VEE relationship of the head planes.

Each one of the first pair of filmstrip edge guides 70 and 72, seen best in FIGS. 8 and 10, extends downward from the first alignment block 58 to contact the adjacent edge of the filmstrip 100 drawn between the wrap rollers 14, 16 (not shown) and the support roller 12. The filmstrip edge guides 70, 72, 74, 76 have angled surfaces as shown. Flexible printed circuit strips extend from the magnetic read/write heads, e.g. strip 48 extending from the magnetic read/write head 30 shown in FIG. 8 and strips 49 and 51 shown in FIG. 3 extending from the magnetic read/write heads 34 and 36.

The second head suspension subassembly 16, comprising the frame 42 and bridge 46, the second pair of filmstrip edge guides 74, 76, the second pair of read/write heads 34, 36, and a second alignment block 78 and second pin slot block 84, is created when these components are assembled in a mirror arrangement to the first head suspension subassembly 14. Components of these two subassemblies 14 and 16 are shown in FIG. 10 in the nesting VEE relationship.

The two subassemblies 14 and 16 are attached together by adhering and fastening the first and second planar flexures 50 and 52 to the flat ends of the bridges 46 and 44, respectively, and the flat sides of frames 40 and 42, respectively. The flat ends of the bridges 44, 46 and sides of the frames 40, 42 are formed with threaded holes for receiving tightening bolts and further bore holes (as shown with respect to the end 45 of bridge 44 in FIG. 8) for receiving adhesives.

The flexures 50 and 52 are perforated with oversize openings to receive the shanks of bolt pairs 54 and 56, respectively, so that there is some play possible in the relative positioning of the subassemblies 14 and 16 with respect to one another on assembly. The fastening of the flexures 50 and 52 to the flat ends and sides of the bridges 44, 46 and frames 40, 42 is effected with adhesive that is pressed into the bore holes and by tightening down the bolt pairs 54, 56 to rigidly fasten subassemblies 14 and 16 together.

The fastening is conducted on a fixture constituting a cylindrical surface of the diameter of the support roller 12 increased by the nominal thickness of a filmstrip. The bolt pairs 54, 56 are loosely attached with the adhesive previously applied, and the attached subassemblies 14 and 16 are centered on the cylindrical fixture. All four magnetic read/write heads 30, 32, 34, 36 are brought into contact with the cylindrical surface by slight adjustment of the frames 40, 42.

Then, the bolt pairs 54, 56 are tightened and the adhesive hardens to form the rigid magnetic head suspension assembly 10.

When subassemblies 14 and 16 are so assembled into the head assembly 10, and when the head assembly 10 is in an advanced position engaging the support roller 12, the head gaps of the magnetic read/write heads 30 and 34 are co-planar in the first common tangent plane ABCD of the support roller 12 following contact line EF, of FIGS. 2A–2D, for example. Similarly, under the same conditions, the head gaps of the magnetic read/write heads 32 and 36 are co-planar in the second common tangent plane IJKL of the support roller 12 following contact line GH (both contact lines EF and GH extending perpendicular to the drawing sheet of FIG. 8). The first and second common tangent planes intersect within the aligned pin slots 66 and 86 of the first and second pin slot blocks 64 and 84, respectively.

When the head assembly 10 is in the advanced position, external tension is applied to bias the head subassemblies 14, 16 toward one another so that the edge guides 70, 72, 74, 76 are urged against and track the filmstrip side edges 102, 104. A coiled wire, tension spring 96 (shown in FIG. 3) attached between the frames 40, 42 may be employed for this purpose.

The magnetic read/write head assembly 10 is intended to be positionable in a retracted position (as shown in FIG. 9 with respect to subassembly 14) with respect to the support roller 12 so that a filmstrip may be threaded over the support roller 12. Once threaded, the magnetic head assembly 10 is moved to the contact or advanced position, and it self aligns to the filmstrip width and achieves a nesting VEE alignment with the support roller 12. The support and alignment mechanism for positioning the assembly 10 in the advanced and retracted positions with respect to the support roller 12 includes the support shaft 90 shown in FIGS. 3 and 9.

Support shaft 90 extends generally in the Z-direction perpendicular to the axis of rotation of the support roller 12 and the direction of filmstrip transport, or the Y and X-directions, respectively, of FIG. 3. Support shaft 90 extends into the center of the head assembly 10 between the first and second head and edge guide assemblies 60, 62 from a lift mechanism 24 suspended above the filmstrip transport mechanism frame. The support shaft 90 is itself suspended by the lift mechanism 24 so that it may rotate about its axis and can also be moved in the Z-direction toward and away from the support roller 12 by operation of lever 25 or by a solenoid drive or other suitable mechanism.

The head assembly 10 is suspended above the support roller 12 and with respect to the wrap rollers 20, 22 in the advanced or retracted position by the shaft 90. A transverse support pin 88 extending through shaft 90 slips into the aligned pin slots 66 and 86 of the head assembly 10. FIG. 9 depicts the transverse support pin slipped into the pin slot 66. The filmstrip 100 is cut away so that only a portion of its width is shown. A head loading spring 92 employed in the loading of the magnetic heads 30, 32 as described below is also depicted.

Figure 7:
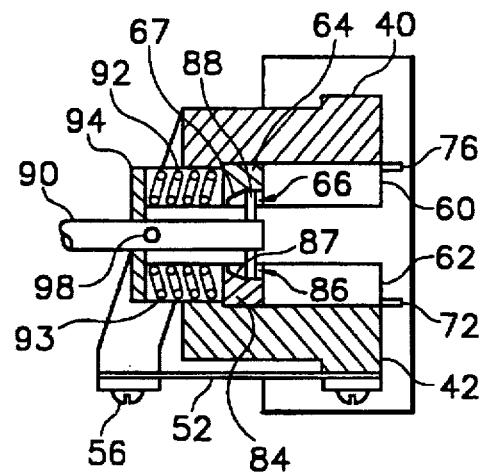
FIG. 7 is a side, partial cross-section, schematic view of the magnetic head suspension assembly of FIG. 4 taken along the lines A—A.

As shown in FIGS. 4 and 7, the two subassemblies 14, 16 are spring loaded with respect to the support shaft 90 by first and second head loading springs 92 and 93 and a rocker yoke 94. One end of head loading springs 92, 93 is trapped on a pin extending upward from the frames 40, 42 and the other end is trapped at the free ends of the rocker yoke 94. The rocker yoke 94 may be either a solid bar with bores for receiving the ends of head loading springs 92, 93 or a U-shaped bar. In either case, the rocker yoke 94 is pivotally mounted on shaft 90 by rocker pin 98 extending through shaft 90 and bore holes in yoke 94. Rocker yoke 94 can rock back and forth on the pin 98 to the extent necessary to equalize forces applied by the head loading springs 92, 93 onto the alignment blocks 58, 78.

When the rocker yoke 94 is assembled on shaft 90, and support pin 88 is engaged in aligned pin slots 66 and 86, the rocker yoke 94 compresses the first and second head loading springs 92, 93 somewhat. The spring loading forces applied against the respective alignment blocks 58 and 78 are equalized by the centering pivot motion of the rocker yoke 94 on rocker pin 98. The entire magnetic read/write head assembly 10 is thereby supported on the shaft 90 with respect to the axis of the support roller 12.

When the shaft 90 is in the advanced position, the pairs of magnetic read/write heads 30, 32 and 34, 36 are pressed against the filmstrip MOF layer 120 in the regions 100a and 100b such that the head loading springs 92, 93 are compressed. In this contact or advanced position, the transverse support pin 88 is relatively low in the aligned pin slots 66, 86 as shown in FIG. 8. The pin 88 and the width of the pin slots 66, 86 are dimensioned in accordance with manufacturing tolerances to allow slight play.

Returning to FIG. 3, the shaft 90 is supported in a lift mechanism 24 for movement along its axis in the Z-direction from the advanced, operative relationship with the support roller 12 depicted in FIGS. 7 and 8 to the retracted, spaced apart position depicted in FIG. 9 to allow the filmstrip 100 to be threaded between the support roller 12 and the wrap rollers 20 and 22. As described above, the wrap rollers 20, 22 are independently supported and may be separately raised and lowered at different times or simultaneously with the advancement and retraction of the magnetic head suspension assembly 10.

The lift mechanism 24 depicted in FIG. 3 is a test fixture configuration that provides for manual advancement and retraction of shaft 90 and the head suspension assembly 10 by operating the lever 28. The upright frame 25 of the lift mechanism 24 supports the lever 28 and maintains the shaft 90 in the Z-direction. The shaft 90 extends through a bearing sleeve in a side arm 27 and into a loose coupling 29 with an extension shaft 91. Because of the suspension of the shaft 90 in this fashion, the entire head suspension assembly 10 and shaft 90 may rotate about the Z-direction in response to the forces of the moving filmstrip 100 to achieve the full nesting VEE relationship of the magnetic heads 30, 32, 34, 36 with respect to the surface of the support roller 12. The amount of rotation is limited by the self centering, nesting VEE arrangement. The transverse pin 88 self aligns in the pin slots 66, 86 with the intersection of the two planes ABCD and IJKL when the assembly is seated by the spring force of the springs 92, 93.

The magnetic head suspension assembly 10 also self aligns to the filmstrip width 108. When the shaft 90 is lifted or retracted axially in the Z-direction to the retracted position, the head subassemblies 14, 16 are spread apart in the Y-direction against the externally applied bias and the bias of the flexures 50, 52. As further shown in FIG. 7, the pin slots 66, 86 are internally shaped with angled cam surfaces 67, 87, respectively. When the shaft 90 is retracted axially to the spaced apart position, the pairs of magnetic read/write heads 30, 32 and 34, 36 are lifted from contact with the filmstrip edge regions 100a and 100b.

This release of force allows the compressed head load springs 92, 93 to lengthen and force the angled cam surfaces 67, 87 down over the ends of the transverse support pin 88.

The spring force is sufficient to cause the ends of the transverse support pin 88 to ride up the cam surfaces 67, 87 until they reach stops. The pin 88 ends thereby apply lateral force and spread apart the first and second alignment blocks 58, 78 and the attached first and second frames 40, 42 against the bias force of tension spring 96. The first and second pairs of edge guides 70, 72 and 74, 76 also spread apart as the first and second alignment blocks 58, 78 spread apart. This feature ensures that the first and second pairs of edge guides 70, 72 and 74, 76 straddle the filmstrip edges 102, 104 when the shaft 90 is again lowered to return the head suspension assembly 10 into the operative contact position.

In this process, as the shaft 90 moves downward, the edge guides 70, 72, 74, 76 are spread apart the maximum amount allowed by the stops. When the pairs of magnetic read/write heads 30, 32 and 34, 36 make contact with stationary filmstrip 100, the shaft 90 is advanced a slight bit further. The ends of suspension pin 88 return to the main part of the elongated aligned pin slots 66, 86 as shown in FIG. 8. As soon as the filmstrip 100 is advanced, the friction of the head gap surfaces with the filmstrip MOF layer 120 breaks free, and the head frames 40, 42 and alignment blocks 58, 78 move toward one another under the influence of the spring force of the external biasing tension spring 96. Movement in the Y-direction is halted by contact of the first and second pairs of edge guides 70, 72 and 74, 76 with the respective filmstrip edges 102 and 104.

In the absence of a filmstrip 100 in the filmstrip transport path when the shaft 90 is lowered, the pairs of edge guides 70, 72 and 74, 76 would be drawn together to assume a spacing apart somewhat less than the nominal width of the filmstrip 100. Therefore, the pairs of edge guides 70, 72 and 74, 76 can come into contact with and follow variations in the filmstrip edges 102 and 104 even if the filmstrip 100 is somewhat shrunken in width from the nominal width 108.

The external spring bias force of tensions spring 96 is low enough, and planar flexures 50, 52 are flexible enough, that the force fit of the edge guides 70, 72, 74, 76 to the width of the flattened filmstrip 100 does not bend the filmstrip edges 102, 104. This is due to the stiffening effect on the filmstrip 100 that follows because of the bending of the filmstrip into the serpentine path. The edge tracking action ensures that the frames 40, 42 are aligned to and track the filmstrip edges 102, 104 under the tension afforded by the first and second planar flexures 50, 52. The close tracking ensures that the magnetic read/write heads 30–36 are aligned to the preset distances of the tracks C0–C3 measured from the filmstrip edges 102, 104.

Although the preferred embodiment described above teaches the relative Z-direction movement of the shaft 90 to effect the advanced and retracted positions, it will be understood that the frame suspending the support roller 12 and the wrap rollers 20, 22 could alternatively be made movable in the Z-direction.

The lift mechanism 24 for the shaft 90 and the magnetic head suspension assembly 10 can be modified to be motor or solenoid operated or remain manually operable, depending on the intended use.

The above described system following the nesting VEE principles could also be incorporated into a camera if enough space is available and the components can be sufficiently miniaturized. A suitable camera operating system for recording information into and reproducing information from one or more spaced parallel tracks in the MOF layer employing such a filmstrip 10 may take the form depicted in the above-referenced U.S. Pat. Nos. '780 or '030.

As described above, it will be understood that at least four magnetic read/write heads, or dummy heads of the same configuration for less than four tracks, must be present to provide the four contact surfaces to effect the nesting VEE relationship of the invention. The four (or fewer) active magnetic read/write heads may be either a read head, a write head or both, depending on the application. Moreover, it will be understood that the invention may be practice with only one track on either edge of the filmstrip and with one of the pairs of magnetic read/write heads being an erase head to erase the track before recording. It will also be understood that the pairs of heads supported in the first and second alignment blocks 58 and 78 may be increased in number, particularly by the addition of floating (spring biased) heads in additional head slots. In such a case, the relative sizes of the components including the support roller 12 may have to be increased to accommodate the additional magnetic read/write heads. In the above description therefore and the following claims it will therefore be understood that the "pairs of magnetic read/write heads" are defined to encompass any combination of pairs of active or dummy magnetic heads for recording, reproducing or erasing in magnetic tracks of magnetic web media.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST FOR FIGS. 1–9 magnetic head suspension assembly 10
support roller 12
first and second head suspension sub-assemblies 14 and 16
axle 18
upstream wrap roller 20
downstream wrap roller 22
lift mechanism 24
upright frame 25
roller support arm 26
side arm 27
lever 28
coupling 29
first pair of magnetic read/write heads 30, 32
second pair of magnetic read/write heads 34, 36
first and second head support frames 40, 42
first and second bridges 44, 46
flexible printed circuit strips 48, 49, 51
first and second planar flexures 50 and 52
bolt pairs 54, 56
first alignment block 58
head and edge guide assemblies 60 and 62
first pin slot block 64
first pin slot 66
angled cam surface 67
first pin slot block 68
first and second pairs of edge guides 70, 72 and 74, 76
second alignment block 78
head slots 80, 82
second pin slot block 84
second pin slot 86
angled cam surface 87
transverse support pin 88
support shaft 90
extension shaft 91
first and second head loading springs 92, 93 rocker yoke 94
tension spring 96
rocker pin 98
filmstrip 100
edge regions 100a and 100b
side edges 102, 104
nominal width 108
base 110
photographic emulsion layers 115
virtually transparent MOF layer 120
anti-static and lubricating layer 122
perforations 125
supply reel 130
take-up reel 132

We claim:

1. A magnetic read/write head support system for recording and/or reproducing information in an elongated, flexible magnetic web advanced in a web transport direction through a web transport path, said system comprising:

a web support roller in said web transport path having an axis of rotation;

wrap means located in said web transport path for wrapping a first side of said web about a wrap section of said support roller;

a magnetic head suspension assembly further comprising:
first and second head suspension sub-assemblies spaced apart in the width dimension of said web;
a first pair of magnetic read/write heads supported by said first head suspension sub-assembly having respective head surfaces adapted to bear against a second side of said web, said head surfaces aligned at a fixed angle to one another in a VEE relationship;
a second pair of magnetic read/write heads supported by said second head suspension sub-assembly having respective head surfaces adapted to bear against the second side of said web, said head surfaces aligned at said fixed angle to one another in said VEE relationship; and
means for fixedly attaching said first and second head suspension sub-assemblies together so that said first and second pairs of magnetic read/write heads form a nesting VEE relationship with respect to said web support roller and the magnetic web wrapped over said web support roller.

2. The magnetic read/write head support system of claim 1 further comprising:

means for supporting said magnetic head suspension assembly for movement between an advanced position for making contact of said magnetic read write heads with the second side of said magnetic web for recording or reproducing information in tracks thereof and a retracted position.

3. The magnetic read/write head support system of claim 2 wherein said first and second head suspension sub-assemblies further comprise first and second respective web edge tracking means for engaging side edges of said web in said wrap section for positioning said first and second respective pairs of magnetic read/write heads in tracks of said web adjacent to said first and second edges when said magnetic head suspension assembly is in said advanced position.

4. The magnetic read/write head support system of claim 3 wherein said magnetic head suspension assembly further comprises:

means for interconnecting said supporting means with said first and second head suspension sub-assemblies for extending said first and second web edge tracking means apart when said supporting means moves said first and second head suspension sub-assemblies into said retracted position and for allowing said first and second edge tracking means to move into engagement with the respective web edges when said supporting means moves said first and second head suspension sub-assemblies into said advanced position.

5. The magnetic read/write head support system of claim 4 wherein said magnetic head suspension assembly further comprises:

tensioning means for exerting tensioning force to draw said first and second edge tracking means toward one another and against said web side edges when said magnetic head suspension assembly is in said advanced position, whereby said web edges are followed by said edge tracking means under the influence of said tensioning force when said web is irregular in width so that said first and second pairs of magnetic read/write heads are spaced uniformly from the respective web edges, said web edges being sufficiently stiffened by the wrapping of said web in said web section to restrain said tensioning force from deforming said web edges.

6. The magnetic read/write head support system of claim 5 wherein said interconnecting means further comprises:

separating means coupled between said suspension means and said first and second head suspension sub-assemblies for effecting the extension apart of said first and second web edge tracking means;

loading means for loading said first and second head suspension sub-assemblies with respect to said suspension means, said loading means operable on movement of said magnetic head suspension assembly into said retracted position by said suspension means for engaging said separating means to extend said first and second web edge tracking means apart, said loading means also operable on movement of said magnetic head suspension assembly into said advanced position by said suspension means for loading said first and second pairs of magnetic read/write heads against the second side of said magnetic web to press said magnetic web against said support roller and for releasing said separating means to allow said first and second web edge tracking means to engage said web edges under the influence of said tensioning means.

7. The magnetic read/write head support system of claim 6 wherein said interconnecting means further comprises:

means for allowing said magnetic head suspension assembly to self align said head surfaces into said nesting VEE relationship to said magnetic web and underlying support roller under the influence of said loading means on movement of said magnetic head suspension assembly into said advanced position.

8. The magnetic read/write head support system of claim 2 further comprising:

means for allowing said magnetic head suspension assembly to self align said head surfaces into said nesting VEE relationship to said magnetic web and underlying support roller on movement of said magnetic head suspension assembly into said advanced position.

9. The magnetic read/write head support system of claim 8 wherein said first and second head suspension sub-assemblies further comprise first and second respective web edge tracking means for engaging side edges of said web in said wrap section for positioning said first and second respective pairs of magnetic read/write heads in tracks of said web adjacent to said first and second edges.

10. The magnetic read/write head support system of claim 1 wherein said first and second head suspension sub-assemblies further comprise first and second respective web edge tracking means for engaging side edges of said web in said wrap section for positioning said first and second respective pairs of magnetic read/write heads in tracks of the second side of said web adjacent to said first and second edges.

11. The magnetic read/write head support system of claim 1 further comprising:

means for allowing said magnetic head suspension assembly to self align said head surfaces into said nesting VEE relationship to said magnetic web and underlying support roller.

12. A magnetic read/write head support system for recording and/or reproducing information in an elongated, flexible filmstrip having a magnetic layer on one side thereof while said filmstrip is advanced in a filmstrip transport direction through a filmstrip transport path, said system comprising:

a filmstrip support roller in said filmstrip transport path having an axis of rotation;

wrap means located in said filmstrip transport path for contacting the side of said filmstrip not having the magnetic layer thereon and wrapping said filmstrip about a wrap section of said support roller;

a magnetic head suspension assembly located with respect to the side of said filmstrip having the magnetic layer thereon further comprising:

first and second head suspension sub-assemblies spaced apart in the width dimension of said filmstrip;

a first pair of magnetic read/write heads supported by said first head suspension sub-assembly having respective head surfaces adapted to bear against said filmstrip magnetic layer, said head surfaces aligned at a fixed angle to one another in a VEE relationship;

a second pair of magnetic read/write heads supported by said second head suspension sub-assembly having respective head surfaces adapted to bear against said filmstrip magnetic layer, said head surfaces aligned at said fixed angle to one another in said VEE relationship; and means for fixedly attaching said first and second head suspension sub-assemblies together so that said first and second pairs of magnetic read/write heads form a nesting VEE relationship with respect to said filmstrip support roller and the filmstrip magnetic layer wrapped over said filmstrip support roller.

13. The magnetic read/write head support system of claim 12 further comprising:

means for supporting said magnetic head suspension assembly for movement between an advanced position for making contact of said magnetic read write heads with the filmstrip magnetic layer for recording or reproducing information in tracks thereof and a retracted position.

14. The magnetic read/write head support system of claim 13 wherein said first and second head suspension sub-assemblies further comprise first and second respective filmstrip edge tracking means for engaging side edges of said filmstrip in said wrap section for positioning said first and second respective pairs of magnetic read/write heads in tracks of said filmstrip magnetic layer adjacent to said first and second edges when said magnetic head suspension assembly is in said advanced position.

15. The magnetic read/write head support system of claim 14 wherein said magnetic head suspension assembly further comprises: means for interconnecting said supporting means with said first and second head suspension sub-assemblies for extending said first and second filmstrip edge tracking means apart when said supporting means moves said first and second head suspension sub-assemblies into said retracted position and for allowing said first and second edge tracking means to move into engagement with the respective filmstrip edges when said supporting means moves said first and second head suspension sub-assemblies into said advanced position.

16. The magnetic read/write head support system of claim 15 wherein said magnetic head suspension assembly further comprises: tensioning means for exerting tensioning force to draw said first and second edge tracking means toward one another and against said filmstrip side edges when said magnetic head suspension assembly is in said advanced position, whereby said filmstrip edges are followed by said edge tracking means under the influence of said tensioning force when said filmstrip is irregular in width so that said first and second pairs of magnetic read/write heads are spaced uniformly from the respective filmstrip edges, said filmstrip edges being sufficiently stiffened by the wrapping of said filmstrip in said filmstrip section to restrain said tensioning force from deforming said filmstrip edges.

17. The magnetic read/write head support system of claim 16 wherein said interconnecting means further comprises:

separating means coupled between said suspension means and said first and second head suspension sub-assemblies for effecting the extension apart of said first and second filmstrip edge tracking means;

loading means for loading said first and second head suspension sub-assemblies with respect to said suspension means, said loading means operable on movement of said magnetic head suspension assembly into said retracted position by said suspension means for engaging said separating means to extend said first and second filmstrip edge tracking means apart, said loading means also operable on movement of said magnetic head suspension assembly into said advanced position by said suspension means for loading said first and second pairs of magnetic read/write heads against said filmstrip magnetic layer to press said filmstrip magnetic layer against said support roller and for releasing said separating means to allow said first and second filmstrip edge tracking means to engage said filmstrip edges under the influence of said tensioning means.

18. The magnetic read/write head support system of claim 17 wherein said interconnecting means further comprises:

means for allowing said magnetic head suspension assembly to self align said head surfaces into said nesting VEE relationship to said filmstrip magnetic layer and underlying support roller under the influence of said loading means on movement of said magnetic head suspension assembly into said advanced position.

19. The magnetic read/write head support system of claim 13 further comprising:

means for allowing said magnetic head suspension assembly to self align said head surfaces into said nesting VEE relationship to said filmstrip magnetic layer and underlying support roller on movement of said magnetic head suspension assembly into said advanced position.

20. The magnetic read/write head support system of claim 19 wherein said first and second head suspension sub-assemblies further comprise first and second respective filmstrip edge tracking means for engaging side edges of said filmstrip in said wrap section for positioning said first and second respective pairs of magnetic read/write heads in tracks of said filmstrip magnetic layer adjacent to said first and second edges.

21. The magnetic read/write head support system of claim 12 wherein said first and second head suspension sub-assemblies further comprise first and second respective filmstrip edge tracking means for engaging side edges of said filmstrip in said wrap section for positioning said first and second respective pairs of magnetic read/write heads in tracks of said filmstrip magnetic layer adjacent to said first and second edges.

22. The magnetic read/write head support system of claim 12 further comprising:
- means for allowing said magnetic head suspension assembly to self align said head surfaces into said nesting VEE relationship to said filmstrip magnetic layer and underlying support roller.

* * * * *

UNITED STATES PATENT AND TRADEMARK OFFICE
CERTIFICATE OF CORRECTION

PATENT NO. : 5,721,652
DATED : February 24, 1998
INVENTOR(S) : Thomas C. Jessop, et al It is certified that error appears in the above-identified patent and that said Letters Patent is hereby corrected as shown below:

Title Page - Related       -- Add --Provisional application No. 60/001,417 July 25, 1995 --
U.S. Application Data
Item [63]

Signed and Sealed this

Nineteenth Day of May, 1998

Attest:

BRUCE LEHMAN

Attesting Officer          Commissioner of Patents and Trademarks